June 3, 1958 P. GENY 2,837,647

ELECTRONIC OSCILLATOR CONTROL MEANS

Filed Oct. 21, 1953

INVENTOR
Paul Geny
BY
Dean Fairbank & Hirsch
ATTORNEYS 2,837,647

ELECTRONIC OSCILLATOR CONTROL MEANS

Paul Geny, Paris, France, assignor to Compagnie Generale de Telegraphie Sans Fil, a corporation of France Application October 21, 1953, Serial No. 387,466

Claims priority, application France October 30, 1952

4 Claims. (Cl. 250—36)

Figure 1:
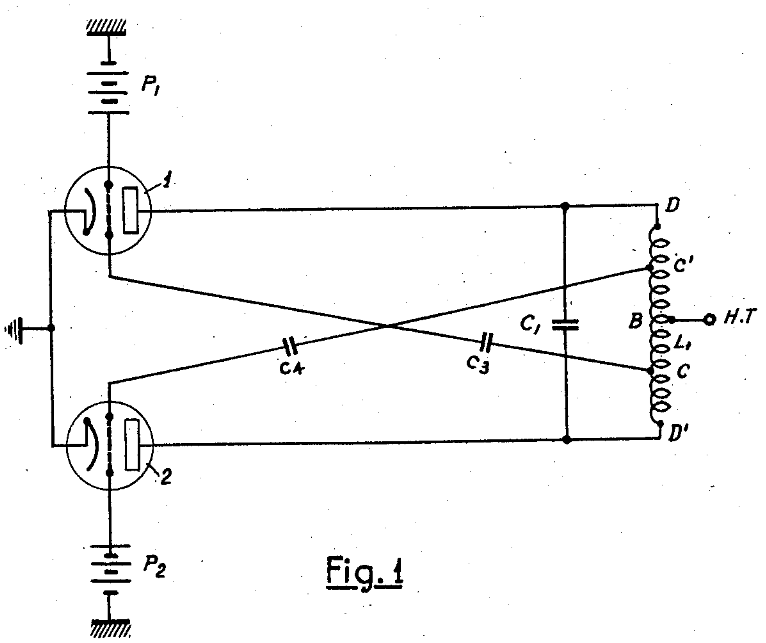

It is frequently necessary, in particular in remote control applications, to utilize electronic oscillators which are normally blocked but whose operation may be started by control signals of suitable form.

Certain arrangements for firing bombs or torpedoes, for example, are based upon the use of oscillators as control means, the operation of which is normally rendered impossible by means of a suitable negative potential applied to one or two control grids of electronic tubes designed to produce high frequency energy. A signal provided in any manner, for example by the target itself, is impressed upon the grid or grids which are negatively biased so as to overcome such bias and permit oscillation. The high frequency energy from the oscillator is utilized to release the firing system.

Such arrangement must be absolutely reliable. In other words, the oscillators must operate only at the approach to the target and the influence of any accidental impulse should be eliminated as far as possible.

It is known that for this purpose oscillators may be constructed having one or more electronic tubes with several control grids that are negatively biased. The oscillator cannot then unblock execpt by the simultaneous reception of two independent signals, the respective intensities of which are such that they overcome the negative bias of the above grids.

The target itself is utilized to provide these two signals by means of conventional circuits that are not within the scope of the present invention. These circuits may produce a signal of a certain form, for example at the approach to the target, and this signal, by derivation for example, may produce two identical impulses which occur precisely at the same instant.

It has so far been customary to utilize in such arrangements an oscillator tube having two negatively biased control grids. The two signals were applied to each grid, and these signals had to be of sufficient intensity to unblock the tube. The oscillator operated therefore as a coincidence system which operated as soon as two impulses appeared simultaneously respectively on its two grids.

Such system has several drawbacks. In the first place, where these oscillators are used on projectiles, shells or rockets for example, it is difficult to construct multiple grid tubes of sufficient strength to withstand the accelerations which are frequently very high, of the order of 20,000 g. for example.

Moreover, the control grids of an electronic tube are not independent. In practice it may occur that, if accidentally a signal of intensity greatly superior to that which is normally utilized is applied to one of the grids of the oscillator tube, the latter commences to oscillate even if no signal is applied to the other grid. This is a serious defect for it may be the cause of accidental release.

An object of the present invention is to provide a new control circuit comprising an electronic oscillator normally blocked, and the operation of which is started by the action of two signals applied to two control grids, this circuit being free from the above defect.

The starting device comprises an oscillator having electronic tubes whose operation is normally rendered impossible by means of a suitable negative bias applied to two control grids of said electronic tubes and which start to oscillate when there are simultaneously applied to said two grids two positive signals whose respective intensities are sufficiently high to overcome the negative bias of said grids. It is characterized in that the oscillator comprises two electronic tubes each of which includes a control grid having sufficient negative bias to render them nonconductive, said two oscillation starting signals being applied respectively to each one of said grids and said two tubes being connected in such manner as to develop voltages in opposition on a common anode circuit so that the latter has a point having zero alternating voltage when the tubes oscillate, the continues high tension source for the tubes being connected to this point through the medium of an impeder having very high impedance.

According to a preferred embodiment of the invention, the oscillator comprises two identical tubes which are push-pull connected their anodes being connected respectively to the two ends of an inductor, which latter forms with a capacitor a resonant circuit, the respective two control grids of these tubes having a negative bias sufficient to render them ordinarily non-conductive and being connected to two symmetrical points so selected that the tubes may oscillate on said resonant frequency, the mid-point of said inductor being connected to the high tension source, which provides the necessary bias to the anodes, through the medium of a resonant circuit having the same frequency as the resonant circuit of the anode.

Figure 2:
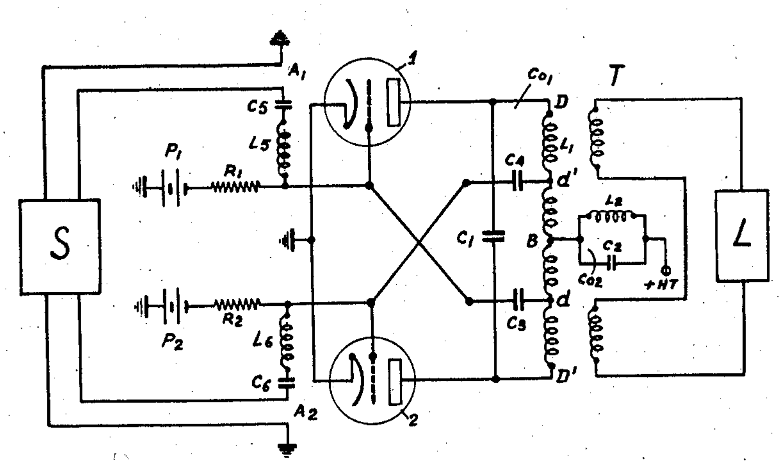

The invention will be better understood from the ensuing description with reference to the accompanying drawings wherein:

Fig. 1 diagrammatically represents an oscillator, having two push-pull connected tubes of known type, which is utilized in the circuit according to the invention, and Fig. 2 represents an embodiment of the invention.

In these figures like reference characters refer to like elements.

Referring to Fig. 1, two identical triodes 1 and 2 are push-pull coupled in accordance with the following known layout:

The cathodes are connected together and earthed; the control grids are biased by means of two adjustable voltage sources $P_1$ and $P_2$. The two anodes are connected to the two terminals of an oscillating circuit comprising a capacitor $C_1$ and an inductor $L_1$. The two grids are connected through two capacitors $C_3$ and $C_4$ to two points $c$ and $c'$ on the inductor $L_1$. These points are so chosen that the feedback which is necessary to make the tubes oscillate is provided. These two points are symmetrically disposed about the mid-point B of the inductor $L_1$. The point B is directly connected to a source of high tension H. T.

If the voltages $P_1$ and $P_2$ are so selected that the two tubes are conductive, such a system would oscillate owing to the coupling between the grids and plates of each tube. Indeed, if $c$ and $c'$ are suitably selected, the voltages applied to the two grids would have the phases necessary to ensure that the oscillations are maintained. For this purpose, it is known to determine by experiment the position of the points $c$ and $c'$ on the inductor $L_1$. Owing to the symmetrical layout $c$ and $c'$ would be substantially symmetrically disposed on either side of B.

As B is in fact earthed through the source of the continuous potential its H. F. will always be zero. The H. F. potentials of D, D', $c$, $c'$ are, owing to the symmertical layout, therefore at every instant equal and opposite in sign as are the currents in each tube.

Now, if the voltage $P_1$ is so chosen as to render the tube 1 non-conductive, the tube 2 will continue to oscillate. As the H. F. potential of B remains zero, the potentials at D′ and c′ will retain such values that the oscillations of the tube 2 will continue to be sustained. The ratio of these voltages will indeed only depend on the relative position of D′ and c′ on the inductor $L_1$. All the foregoing is well known.

Fig. 2 represents the layout of the control device according to the invention.

In this figure the coupling of the cathodes and the plates is the same as in Fig. 1. B is here connected to the H. T. source by means of an oscillating circuit composed of an inductor $L_2$ and a capacitor $C_2$, connected in parallel. The natural frequency of this circuit is the same as that of the circuit $L_1C_1$, or in other words the products $L_2.C_2$ and $L_1.C_1$ are equal.

The grids are again connected to the points *d* and *d′*. They are moreover connected, by resistors $R_1$ and $R_2$ respectively, to the sources of negative voltage $P_1$ and $P_2$. The resistors $R_1$ and $R_2$ and the values of the voltages $P_1$ and $P_2$ are so selected as to render the tubes 1 and 2 ordinarily non-conductive.

A system S, which as such forms no part of the present invention, provides the signals of fixed form and intensity under certain conditions. For example in a sea torpedo this system S would be substantially responsive to the gradient of the magnetic field created by a steel ship.

By means which are conventional and well known per se, there are derived from each of these signals two pulses, which are identical in form and amplitude and are produced simultaneously. One of these pulses is applied between the point $A_1$ and earth, and the other is applied between the point $A_2$ and earth. $A_1$ and $A_2$ are connected to the respective control grids of the tubes 1 and 2, through capacitors and inductors $C_5$, $L_5$ and $C_6$ and $L_6$ respectively.

$L_5$ and $L_6$ are shock inductors which prevent the high frequency energy produced by the oscillator from being propagated towards S.

The inductor $L_1$ is coupled by a secondary winding to a load circuit L in which the energy produced by the oscillator is utilized to fire a suitable machine, for instance a torpedo.

The operation of the above system is the following: if it is supposed that two simultaneous pulses are sent by the system S to the two grids and that these pulses have the effect of unblocking simultaneously the tubes 1 and 2, the unit would start oscillating in the same way as the oscillator shown in Fig. 1.

Owing to the symmetry of the system, the H. F. voltages at *d*, D, *d′*, D′ are respectively equal and opposite in sign. The H. F. voltage at B is zero. The voltages at *d* and *d′* are such as to maintain the oscillations.

If a pulse unblocks the tube 1, for example, while the tube 2 receives no pulse and remains blocked, the result would be different. The alternating potential of B during the oscillation of the tube 1 would not be zero, since B is insulated, in so far as H. F. is concerned, from the H. T. source. Indeed, as the circuit $L_2C_2$ is a parallel resonant circuit, alternative current cannot flow towards the H. T. source and the phase conditions between the H. F. voltages at D and *d* respectively will no longer be such as to sustain the oscillations produced by the tube 1.

It would be easily understood that the choice of the point *d* as it has been made is valid in so far as the sustaining of the oscillations is concerned, if the alternating potential of B is zero and it is therefore clear from the foregoing that the presence of the circuit $L_2C_2$ prevents the tube 1 from oscillating alone. Hence the system would no longer oscillate and no energy would be transmitted to the device L if control pulses are applied only to one of the tubes 1 and 2.

Accordingly the arrangement shown permits the practical elimination of any risk of accidental starting of the oscillations.

It will be noted that the layout according to the invention permits the use of simple triodes, that is of very strong tubes, and that the arrangement has great simplicity.

Having thus described my invention what I claim as new and desire to secure by Letters Patent of the United States is:

1. In a starting device, an oscillator comprising two electronic tubes connected in opposition, each of said tubes having at least a cathode, a control grid and an anode, means to apply a negative bias to said two grids for rendering said two tubes ordinarily non-conductive, an anode circuit common to said two tubes and resonant at a certain resonant frequency whereby said circuit has a mid-point having zero alternating potential when the oscillator is oscillating; means comprising a circuit resonant at said resonant frequency, said circuit comprising an inductor and a capacitor connected in parallel and constituting, for said frequency, a high impedance connecting said mid-point to a source of direct-current high tension, means for connecting to earth said two cathodes, means for applying to each of said two grids signals of sufficient intensity to overcome said negative bias whereby the system is caused to oscillate only upon the simultaneous reception of said signals at each of its grids, and a load circuit connected to said anode circuit.

2. Device as claimed in claim 1, wherein said anode circuit comprises an inductor and a capacitor connected in parallel, and means for connecting said two grids to two points on said inductor.

3. A device according to claim 1 in which said tubes are identical whereby said point of zero alternating voltage is electrically the central point of said anode circuit.

4. In a starting device, an oscillator comprising two electronic tubes connected in opposition, each of said tubes having at least a cathode, a control grid and an anode, means to apply a negative bias to said two grids for rendering said two tubes ordinarily non-conductive, an anode circuit common to said two tubes and resonant at a certain resonant frequency whereby said circuit has a mid-point having zero alternating potential when the oscillator is oscillating, an impedance constituted by a parallel resonant circuit tuned to the same frequency as said resonant anode circuit and connecting said mid-point to a source of direct-current high tension, means for connecting to earth said two cathodes, means for applying to each of said two grids signals of sufficient intensity to overcome said negative bias whereby the system is caused to oscillate only upon the simultaneous reception of said signals at each of its grids, and a load circuit connected to said anode circuit.

References Cited in the file of this patent

UNITED STATES PATENTS

| | | |
|---|---|---|
| 2,326,314 | Usselman | Aug. 10, 1943 |
| 2,453,529 | Mittelmann | Nov. 9, 1948 |
| 2,483,766 | Hansell | Oct. 4, 1949 |
| 2,496,980 | Blumlein | Feb. 7, 1950 |
| 2,523,476 | Mittelmann | Sept. 26, 1950 |
| 2,553,752 | DeLange | May 22, 1951 |
| 2,598,473 | Warner et al. | May 27, 1952 |
| 2,643,340 | Lawrance | June 23, 1953 |